(12) United States Patent
Nishioka et al.

(10) Patent No.: US 6,311,233 B1
(45) Date of Patent: *Oct. 30, 2001

(54) COMMUNICATION SYSTEM USING A MODEM WITH A MODE IN WHICH DATA RECEIVING OPERATION IS SHIFTED TO CONTROL SIGNAL COMMUNICATION UPON DETECTING A MOMENTARY DISCONNECTION

(75) Inventors: Koji Nishioka, Abiko; Takehiro Yoshida, Tokyo; Hitoshi Saito, Kawasaki, all of (JP); Koji Harada, Rennes (FR)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,679

(22) Filed: Apr. 22, 1998

(30) Foreign Application Priority Data

May 8, 1997 (JP) .................................................... 9-118086

(51) Int. Cl.[7] .................................................. G06F 13/14
(52) U.S. Cl. ............................ 710/14; 375/220; 375/222; 375/257; 375/377
(58) Field of Search .............................. 710/14; 375/220, 375/222, 219, 257, 259, 377

(56) References Cited

U.S. PATENT DOCUMENTS

| | | | | |
|---|---|---|---|---|
| 5,450,530 | * | 9/1995 | Snyder et al. | 375/220 |
| 5,550,881 | * | 8/1996 | Sridhar et al. | 375/377 |
| 5,684,825 | * | 11/1997 | Ko | 375/222 |
| 5,732,104 | * | 3/1998 | Brown et al. | 375/222 |
| 5,946,348 | * | 8/1999 | Mizutani et al. | 375/222 |
| 6,038,252 | * | 3/2000 | Mizutani et al. | 375/222 |

* cited by examiner

Primary Examiner—Thomas Lee
Assistant Examiner—Abdelmoniem Elamin
(74) Attorney, Agent, or Firm—Fitzpatrick, Cella, Harper & Scinto

(57) ABSTRACT

Even if a signal line is momentarily disconnected while data communication, such as image data communication, is being performed by using, for example, an ITU-T Recommendation V.34 modem, communication is suitably continued. A main controller (CPU) determines the operating state (status) of a modem having the following mode. In this mode, the receiving operation of an image signal is automatically shifted to control signal communication upon detecting a pattern of a training signal. The main controller enables the above mode if it determines that the receiving status of the modem is not normal. It is thus possible for the modem to shift from the receiving of an image signal to control signal communication when the signal line is momentarily disconnected.

12 Claims, 12 Drawing Sheets

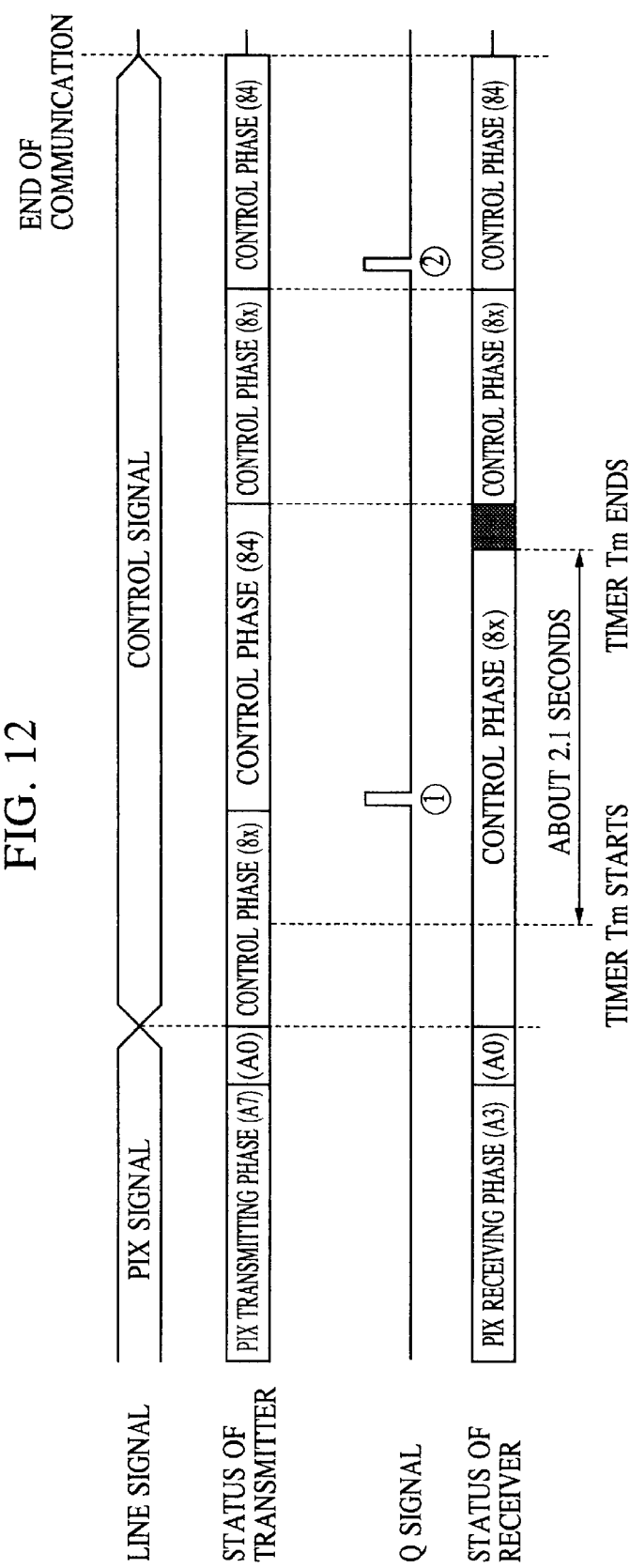

COMMUNICATION SYSTEM USING A MODEM WITH A MODE IN WHICH DATA RECEIVING OPERATION IS SHIFTED TO CONTROL SIGNAL COMMUNICATION UPON DETECTING A MOMENTARY DISCONNECTION

BACKGROUND OF THE INVENTION

1. Field of the Invention

The present invention relates to a communication apparatus that performs data communication, such as communication of image data and text data, by using a modem having a mode in which a data receiving operation is automatically shifted to a control signal communication upon detection of a training signal pattern during the data receiving operation. The invention also relates to a communication method used in the above communication apparatus.

2. Description of the Related Art

Along with the increased transmission rate of modems, it is possible that 28.8-bps modems in compliance with ITU-T Recommendation V.34 can be used even in communication apparatuses, such as facsimile machines. In performing facsimile communication by using a modem having such a high transmission rate, V.34 communication image data is formed of a continuous superframe (280 ms). Accordingly, if a line signal is momentarily disconnected while communication of image signals is being performed, the synchronization of superframe communications is lost, and image data cannot be received until the synchronization of superframe communications is recovered. What is worse, processing for providing resynchronization after the line signal is interrupted is technically complicated, and resynchronization is substantially impossible to provide if the line signal is disconnected for 30 ms or longer, thereby failing to correctly receive the subsequent image data.

Some V.34 modems have the following mode: upon detection of a training signal pattern while an image signal is being received, the operation is automatically shifted from the receiving of the image signal to the training signal. If the above-described mode is disabled, even if a signal pattern similar to a training signal is detected while an image signal is being received, the operation is not shifted to the receiving of the training signal but continues to receive the image signal. This makes it possible to hold the image signal in the same channel as the one used before the receiving of the image signal was interrupted. Thus, if the signal line is disconnected only for a very short time, the image signal continues to be received after synchronization is re-established. However, when the foregoing mode is disabled, communication is shifted to a control channel (control signals) only when a return-to-control-procedure (RCP) signal (a signal for shifting communications to a control channel) added to the end (the end of a block) of an image signal is detected. Thus, if a signal is disconnected for 30 ms or longer, the modem is unable to detect the RCP signal and to perform demodulation, thereby failing to shift the communications to the control channel. Thus, the subsequent process cannot be performed, and the communications are ended erroneously.

Conversely, if the foregoing mode is enabled, communication is shifted from the receiving operation of an image signal to a control channel even if an RCP signal is not correctly received and detected, thereby making it possible to perform the subsequent process. On the other hand, if a pattern similar to a training signal is contained in the received image signal, the modem erroneously detects it as a training signal and is unable to perform demodulation by initializing an equalizer of the modem. This makes it impossible for the modem to receive the subsequent image signals. Further, any momentary disconnection of a signal immediately causes the communication to shift from the receiving operation of the image signal to the control signal. Accordingly, the time limit may be reached while communication is still being made.

In this manner, data communication performed by using modems having a high transmission rate, such as V.34 modems, is more vulnerable to momentary disconnection of a line signal than those by using conventional V.17 modems having a 14.4 kbps or lower rate, thereby causing more communications errors.

SUMMARY OF THE INVENTION

Accordingly, in view of the above background, it is an object of the present invention to provide an improvement in a communication apparatus.

It is another object of the present invention to provide a communication apparatus which performs data communication by using a modem having a high transmission rate, such as a V.34 modem, and which performs data communication smoothly and continuously by suitably shifting it to control signal communication even if a line signal is momentarily disconnected during data communication.

In order to achieve the above objects, according to one aspect of the present invention, there is provided a communication apparatus performing data communication by using a modem having a mode in which a data receiving operation is automatically shifted to control signal communication upon detecting a training signal while the data receiving operation is being performed. The above communication apparatus includes determining means for determining an operating status of the modem, and switching means for selectively enabling or disabling the mode of the modem in accordance with the operating status of the modem determined by the determining means.

According to another aspect of the present invention, there is provided a communication apparatus performing data communication by using an ITU-T Recommendation V.34 modem having a mode in which a data receiving operation is automatically shifted to control signal communication upon detecting a training signal while the data receiving operation is being performed. The above communication apparatus has determining means for determining an operating status of the modem, and switching means for selectively enabling or disabling the mode of the modem in accordance with the operating status of the modem determined by the determining means. The switching means has timer means which counts for a predetermined time upon completion of receiving data. The switching means then selectively enables or disables the mode of the modem in accordance with a result determined by the determining means and the counting for the predetermined time by the timer means.

According to still another aspect of the present invention, there is provided a communication apparatus which performs data communication and control signal communication by using an ITU-T Recommendation V.34 modem and which shifts to the control signal communication upon completion of receiving data. The above communication apparatus has a timer for determining the timing for shifting to retrain control executed in the control signal communication, and means for setting a count time of the timer to be shorter than the time specified in ITU-T Recommendation V.34 and for performing the retrain control within a shorter time interval.

According to a further aspect of the present invention, there is provided a communication method in which data communication is performed by using a modem having a mode in which a data receiving operation is automatically shifted to control signal communication upon detecting a training signal while the data receiving operation is being performed. The above method has the steps of determining an operating status of the modem, and selectively enabling or disabling the mode of the modem in accordance with the operating status of the modem determined by the determining means.

Further objects, features and advantages of the present invention will become apparent from the following description of the preferred embodiments with reference to the attached drawings.

BRIEF DESCRIPTION OF THE DRAWINGS

FIG. 12 illustrates an example of a communication sequence performed when a signal line is momentarily disconnected while a control signal is being transmitted according to another embodiment of the present invention.

DESCRIPTION OF THE PREFERRED EMBODIMENTS

A detailed description is given below of embodiments of the present invention with reference to the drawings.

Figure 1:
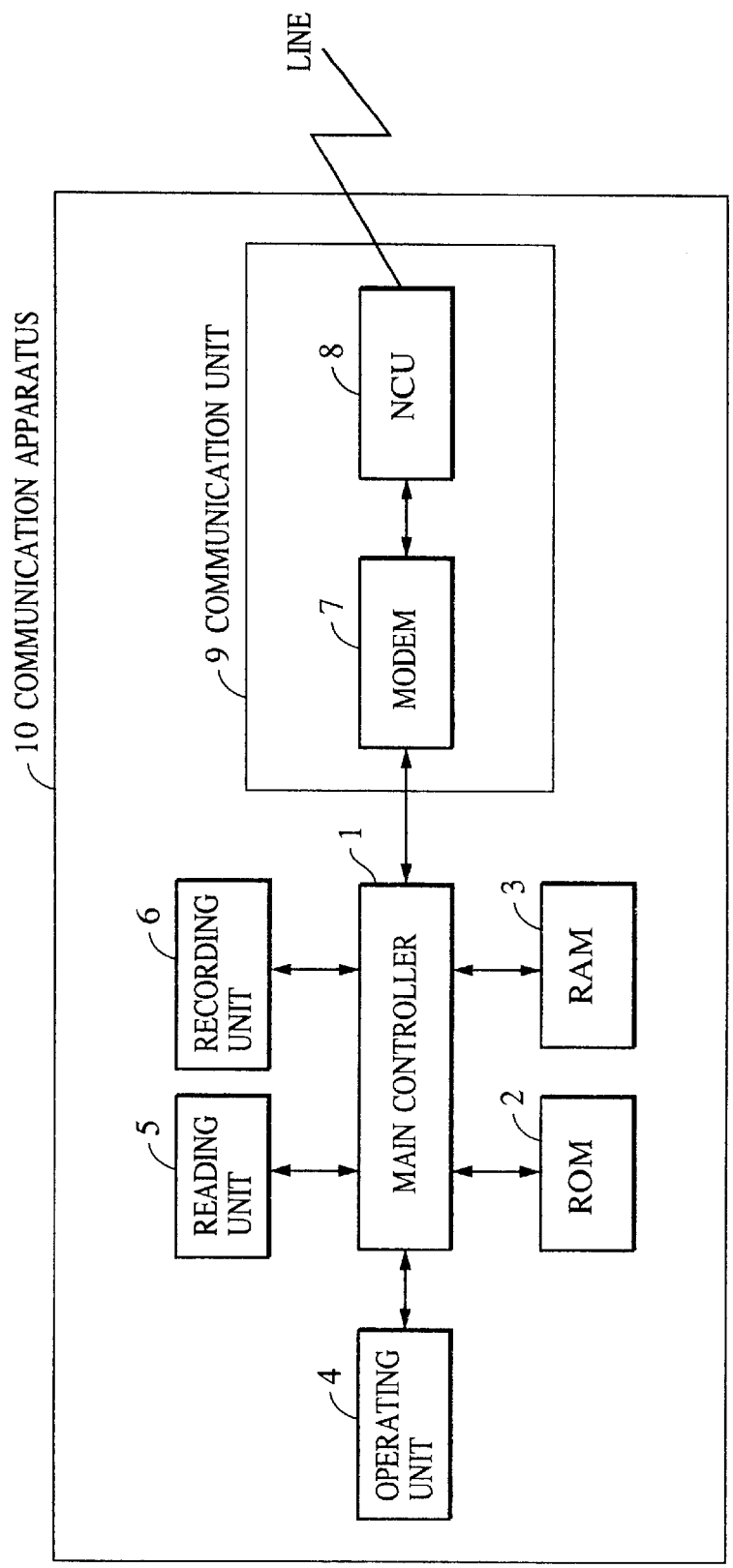
FIG. 1 is a block diagram illustrating the configuration of a facsimile machine according to an embodiment of the present invention.

An embodiment of the present invention is described. Referring to the block diagram illustrating the configuration of a facsimile machine of this embodiment shown in FIG. 1, a main controller 1 is formed of a microcomputer and controls the overall apparatus. A read only memory (ROM) 2 stores a control program run by the main controller 1. A random access memory (RAM) 3 stores data which is able to be set by the operator and is used as a work area of the main controller 1. An operating unit 4 is formed of various keys (keyboards), a key input section, a liquid crystal display (LCD), and a light emitting diode (LED). A reading unit 5 for optically reading images formed on a document is formed of a document feeding mechanism and a reading sensor, such as a CCD. A recording unit 6 for visually recording image data has an ink-jet or electrophotographic printer. A modem 7 modulates transmitting signals and demodulates receiving signals, and the Rockwell-made R288F modem in compliance with ITU-T Recommendations V.8, V.34, V.21, V.17, or V.29 is used in this embodiment. A network control unit (NCU) 8 is used for connecting a public switched telephone network (PSTN). The modem 7 and the NCU 8 form a communication unit 9.

Figure 2:
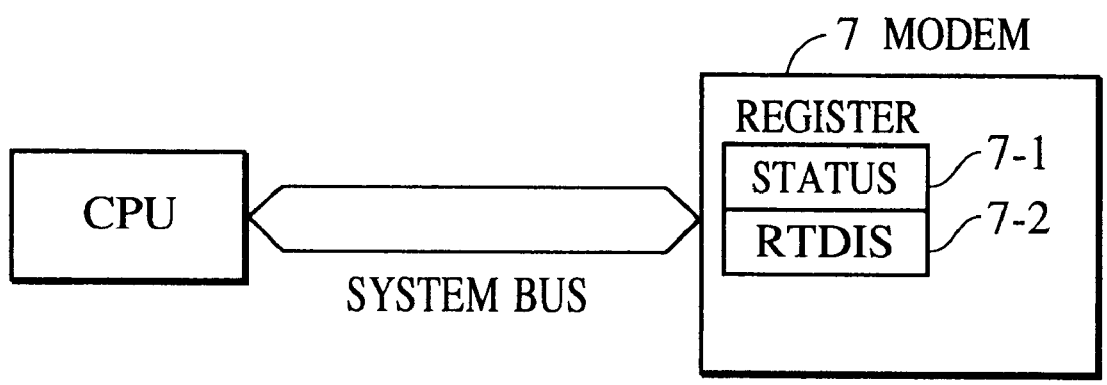
FIG. 2 illustrates the connecting relationship between a CPU and a modem used in the facsimile machine shown in FIG. 1.

FIG. 2 illustrates the relationship of the connection between the microcomputer (CPU) of the main controller 1 and the modem 7.

The CPU and the modem 7 are connected by a system bus through which both elements transmit and receive data. The modem 7 is provided with a register 7-1 for notifying the status of the modem 7 to the CPU. In the modem 7, information representing the operating status of the modem 7 (for example, Ax indicates that the modem 7 is in the retraining sequence before receiving an image signal, and 8x represents that the modem 7 is in the control phase) is stored in the register 7-1. The CPU then reads the information stored in the register 7-1 via the system bus within a predetermined interval (for example, 1 ms) and analyzes the read information, thereby recognizing the operating status of the modem 7.

Further, the modem 7 has the following mode. Upon detection of a training signal pattern while an image signal is being received, the operation is automatically shifted to the receiving of the training signal from the receiving of the image signal. The CPU is able to enable or disable the above mode. More specifically, the modem 7 is provided with an RTDIS register 7-2. When the CPU writes "1" (on) into the register 7-2, the RTDIS is turned on to disable the above mode. Conversely, when the CPU writes "0" (off) into the register 7-2, the RTDIS is turned off to enable the above mode.

A description is first given of communication performed when the RTDIS is turned on to disable the above mode. Even if a pattern similar to a training signal is detected during the receiving of an image signal, the modem 7 does not shift the operation to the receiving of the training signal but continues to receive the image signal. Then, even when the signal line is momentarily disconnected during signal transmission in the V.34 mode, the image signal is held in the same channel as the one used before the signal was interrupted. Thus, when synchronization is re-established once again, the receiving operation of the image signal is continued. Further, in the disabled mode of the modem 7, the RTDIS is automatically turned off to shift the operation to control channel communication only when an RCP signal (i.e., the signal for shifting to control channel communication) added to the end of the image signal (the end of the block of the image signal) is detected. Accordingly, if the modem 7 fails to perform demodulation by interrupting the receiving operation of the image signal due to the disconnection of a signal line, and fails to detect the RCP signal, the modem 7 is unable to shift the operation to control channel communication. Thus, the subsequent process cannot be performed, and the communication is ended erroneously.

A description is now given of communication performed when the RTDIS is turned off to enable the above-described mode. In this mode, it is possible to shift the operation from the receiving of an image signal to control channel communication even though the RCP signal is not correctly received and detected, thereby making it possible to perform the subsequent process. In the enabled mode of the modem 7, however, if the received signal contains a pattern similar to a training signal, the modem 7 erroneously detects the pattern as a training signal. The modem 7 fails to perform demodulation by initializing the equalizer of the modem 7, thereby being unable to receive the subsequent image signals. Moreover, if the receiving signal is momentarily disconnected, the operation is immediately shifted from the receiving of the image signal to control channel communication. Thus, the time limit may be reached while the communication is still being made.

A description is now given of a communication sequence when the RTDIS of the modem 7 is on and an image signal is correctly received.

Figure 3:
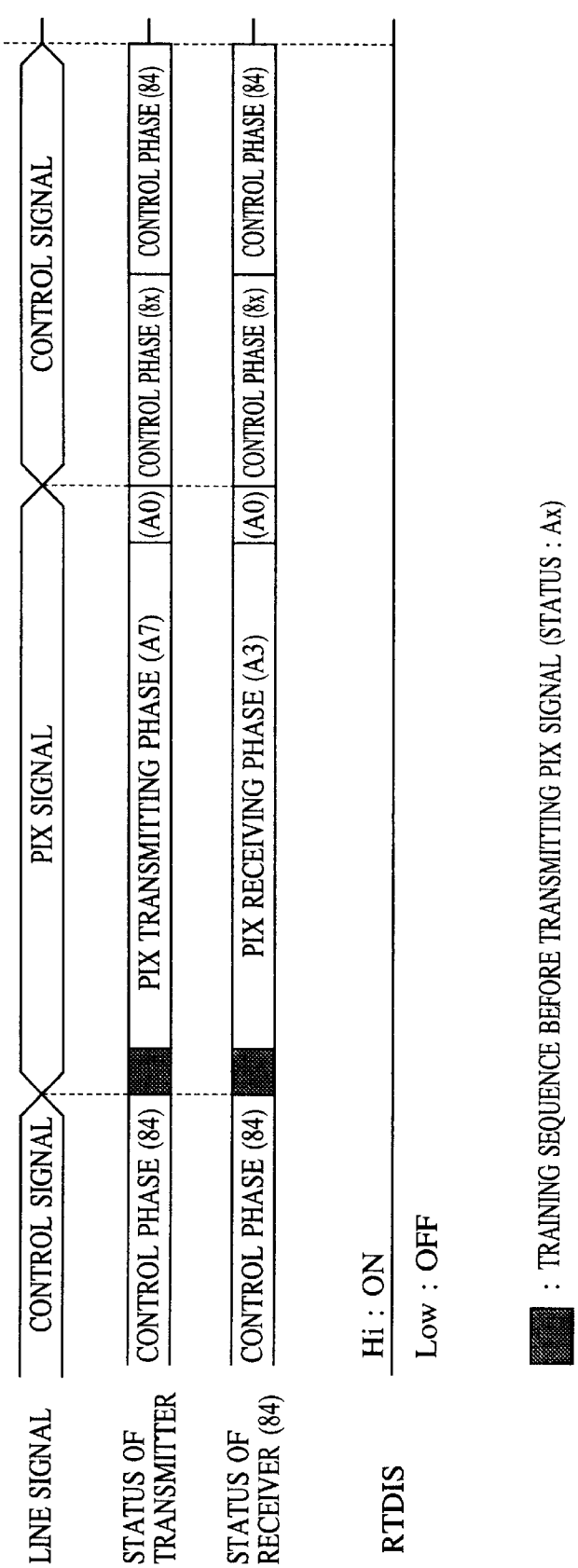
FIG. 3 illustrates an example of a normal communication sequence.

FIG. 3 illustrates a communication sequence when communication is performed under normal conditions. The signals indicated in the first sequence shown in FIG. 3 represent signals which are being output to the line. The signals of the second sequence represent the transmitting status of the transmitter, and the numbers indicated in parentheses designate the operating status of the transmitting modem. The signals of the second sequence are receivable and recognizable by the receiver. The signals of the third sequence indicate the receiving status of the receiver, and the numbers in the parentheses also represent the operating status of the receiving modem. The RTDIS of the fourth sequence represents control signals, which are used for automatically enabling or disabling the recognition of a training signal provided with the receiving modem 7. When the RTDIS is on, the receiving modem 7 does not shift the operation to the receiving of a training signal even if a pattern similar to a training signal is detected. Instead, only when the RCP signal added to the end of the image signal is detected, does the modem 7 shift the operation to control channel communication. Conversely, when the RTDIS is off, the receiving modem 7 shifts the operation to the receiving of a training signal upon detection of a pattern similar to the training signal. It should be noted that the RTDIS is normally turned on.

Figure 4:
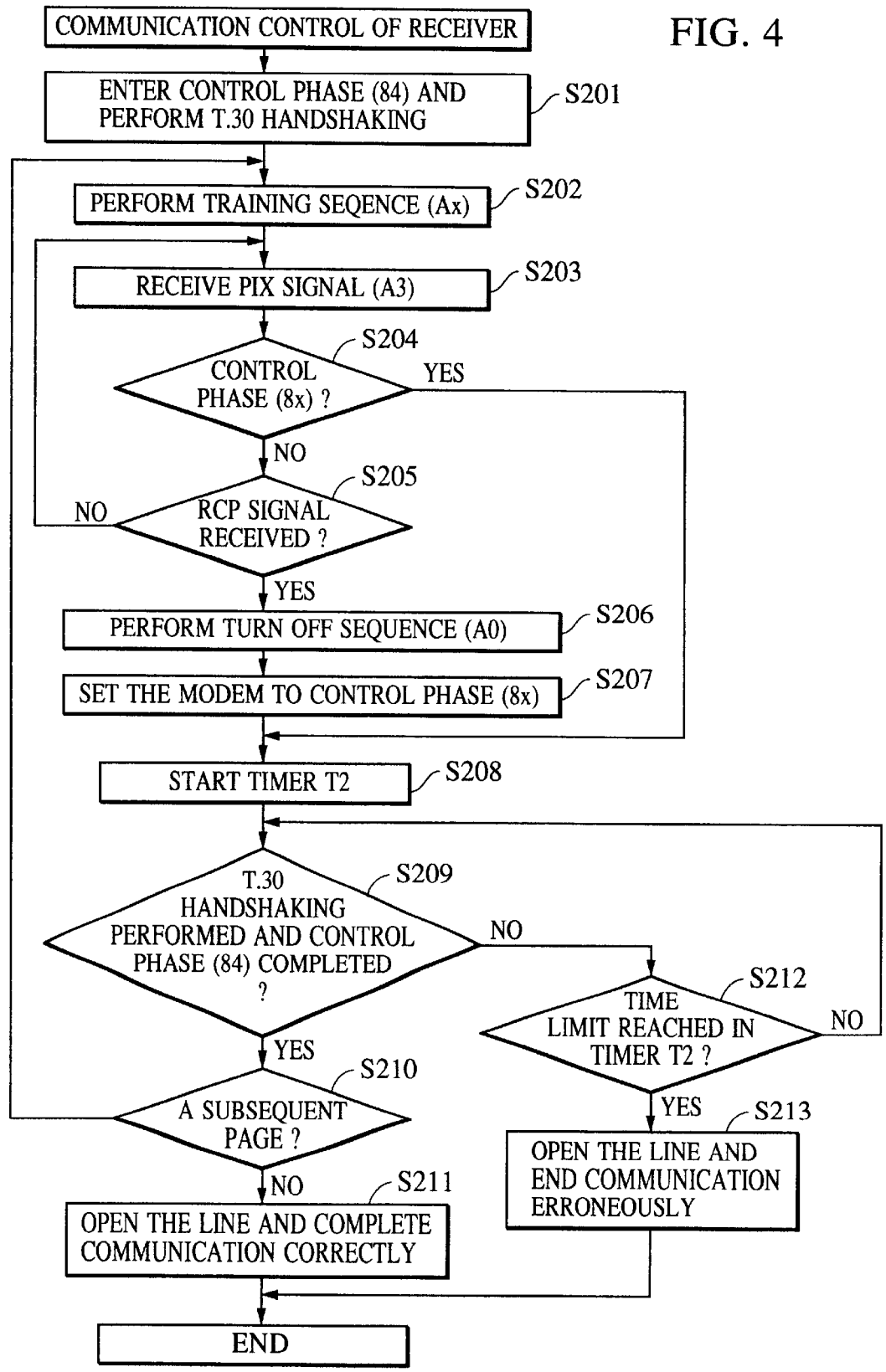
FIG. 4 is a flow chart illustrating the receiving operation performed by the CPU.

FIG. 4 is a flow chart illustrating the communicating operation (the operation performed based on the program stored in the ROM 2) of the CPU of the receiving modem 7. In the flow chart illustrated in FIG. 4, as well as in the sequence shown in FIG. 3, the operation is started from the communication control phase (84).

In step S201, the operation enters the control phase (84) and performs T. 30 handshaking in compliance with ITU-Recommendation. In step S202, the retraining sequence (Ax) is carried out prior to the receiving of a PIX (image) signal. Subsequently, the receiving operation of the PIX signal (A3) commences in step S203. It is then checked in step S204 whether the status of the receiving modem 7 has entered the control phase (8x). If the answer of step S204 is yes, the process proceeds to step S208. Conversely, if the answer of step S204 is no, the flow proceeds to step S205. When the RTDIS is on, the modem 7 does not enter the control phase (8x) regardless of whether the receiving image signal is momentarily interrupted. Accordingly, the answer of step S204 is no. In contrast, when the RTDIS is off, the modem 7 automatically shifts the operation to the control phase upon detection of a training signal pattern or momentary disconnection of a line signal. Accordingly, the answer of step S204 is yes, and the flow proceeds to step S208.

It is determined in step S205 whether the RCP signal, which indicates the end of the PIX signal, has been received. If the answer of step S205 is yes, the flow proceeds to step S206. If the answer is no, the flow returns to step S203 in which the PIX signal continues to be received. In step S206, the modem 7 performs the turn off sequence (A0), and in step S207, the status of the modem 7 is set to the control phase (8x), thereby terminating the communication process.

In step S208, the timer T2 is started. The timer specified in ITU-T Recommendation V.34 is used as the timer T2, and it is started upon commencement of command retrieval and is reset when a command is received or the time limit is reached. The time limit of the timer T2 is specified as 6±1 seconds.

It is then determined in step S209 whether T. 30 handshaking in compliance with ITU-T Recommendation V.34 has been performed. If the answer of step S209 is yes, the flow proceeds to step S210. If the answer is no, the flow proceeds to step S212.

It is then checked in step S212 whether the time limit has been reached in the timer T2. If the answer of step S212 is yes, the process proceeds to step S213 in which the communication ends erroneously, and the line is opened. If the answer is no, the flow returns to step S209.

In step S210, the presence of a subsequent document is checked. If the answer of S210 is yes, the process returns to step S202. If the answer is no, the flow proceeds to step S211 in which the line is opened, and the communication is completed correctly.

In the foregoing flow, if communication is correctly made while the RTDIS is on, the communication sequence shown in FIG. 3 is performed. Alternatively, if the modem 7 fails to perform demodulation because of the momentary disconnection of the line signal so as to fail to correctly receive the RCP signal, it is found in step S205 that the RCP signal has not been received. As a result, the communication ends erroneously.

Figure 5:
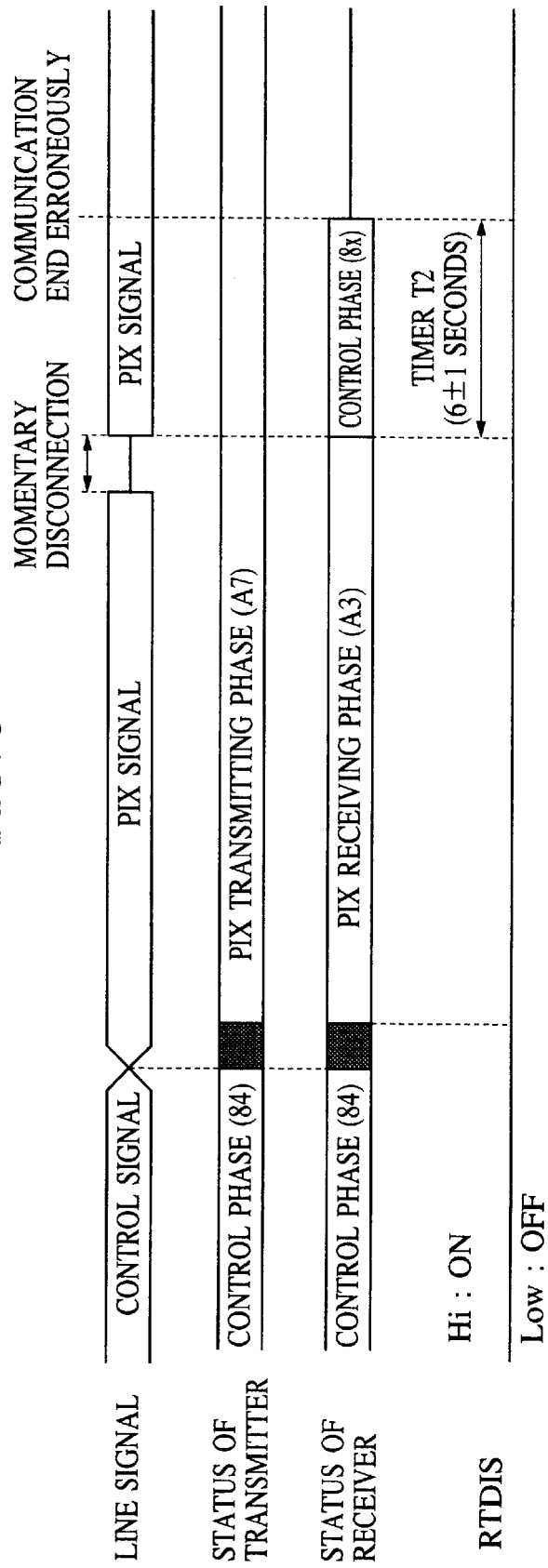
FIG. 5 illustrates an example of a communication sequence performed when a signal line is momentarily disconnected while an image signal is being received.

On the other hand, the communication sequence when the RTDIS of the modem 7 is off and the receiving signal is momentarily disconnected is shown in FIG. 5.

The signals indicated in the sequence of FIG. 5 are similar to those shown in FIG. 3. In this state of the RTDIS of the modem 7, if the synchronization of the PIX signal is lost due to momentary disconnection of the image signal, as illustrated in FIG. 5, the receiving modem 7 shifts the operation to the control phase (8x) immediately when the image signal is disconnected. Namely, the receiving modem 7 waits for control signals (V.34 communication control signals, such as a Sh signal, an ALT signal, and an E signal) of the control phase (8x). Accordingly, the CPU causes the process to proceed from step S204 to step S208 in which the timer T2 is started. However, since the transmitting modem is transmitting a PIX signal, the receiving modem is unable to receive the control signals of the control phase (8x). In this manner, the receiving modem 7 shifts the operation to the control phase (84) immediately when the line signal is disconnected. If a command signal (Q signal) is not received before the time limit is reached in the timer T2, the communication ends erroneously.

Figure 6:
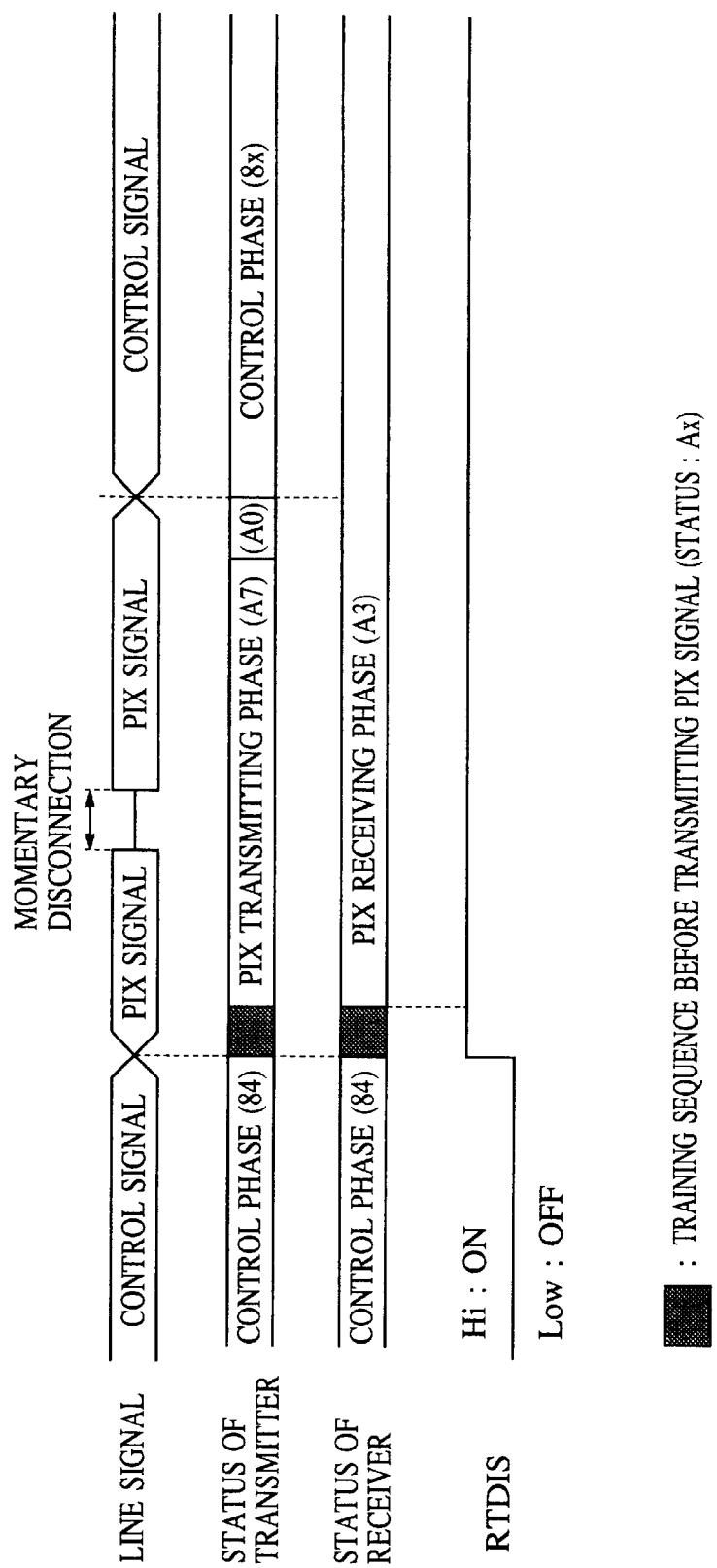
FIG. 6 illustrates another example of a communication sequence performed when a signal line is momentarily disconnected while an image signal is being received.

FIG. 6 illustrates the communication sequence when the RTDIS of the modem 7 is switched on while the image signal is being received. The signals shown in FIG. 6 are similar to those illustrated in FIG. 3. When the synchronization of the PIX signal (image signal) is lost due to the momentary disconnection of the line while the RTDIS is on, as illustrated in FIG. 6, the receiving modem is unable to detect the end signal (RCP signal) of the PIX signal. It is therefore impossible for the CPU of the receiving modem 7 to proceed to the process steps after step S205, as shown in the flow chart of FIG. 4. Namely, the CPU of the receiving modem 7 cannot enter the control phase (8x) and repeats the loop of steps S203 and S205. Therefore, the receiving modem 7 is connected to the line until the transmitting modem completes the transmitting operation of the PIX signal and proceeds to the control phase (84) to forcefully disconnect the line. The communication thus ends erroneously.

Accordingly, in this embodiment, the RTDIS of the modem 7 is switched between on and off while an image signal is being received. It is thus possible to suitably shift the operation from the receiving of an image signal to control channel communication even though the line signal is momentarily interrupted during the receiving operation of the image signal.

Figure 7:
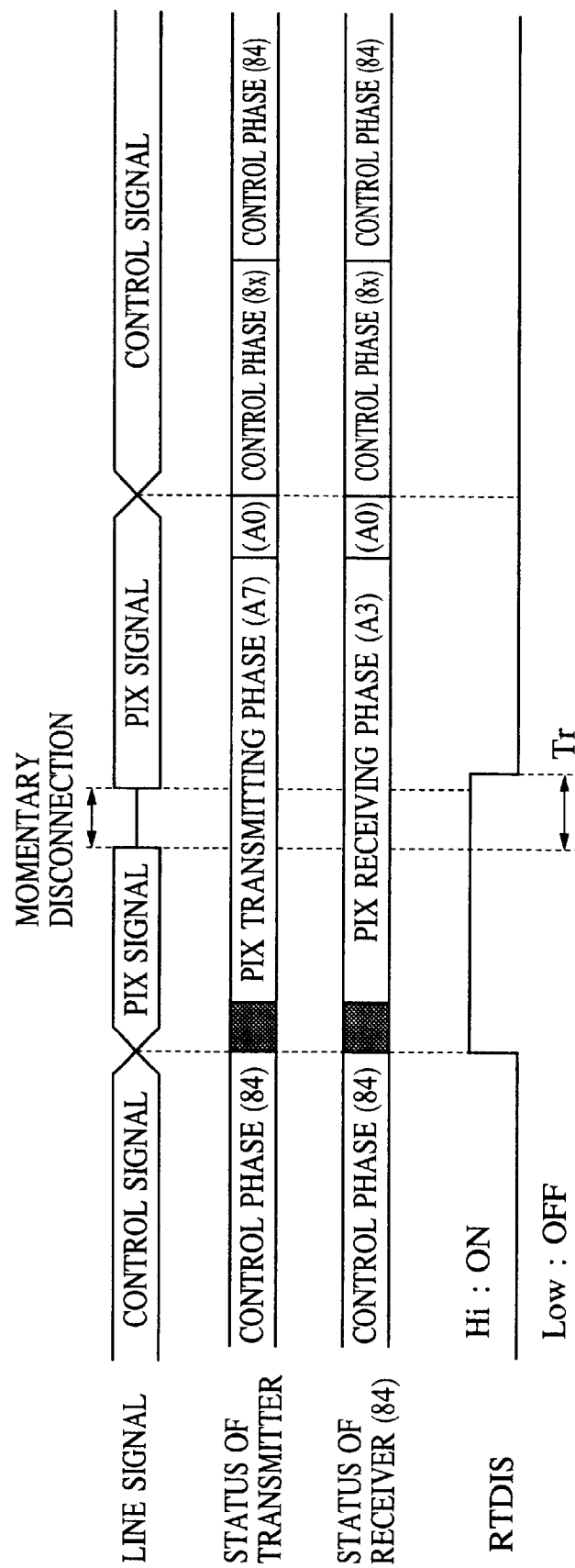
FIG. 7 illustrates an example of a communication sequence performed when a signal line is momentarily disconnected while an image signal is being received according to an embodiment of the present invention.

FIG. 7 illustrates a communication sequence of this embodiment. The signals shown in FIG. 7 are similar to those illustrated in FIG. 3. In this sequence, the RTDIS is on at high level (Hi), while the RTDIS is off at low level (Low).

Figure 8:
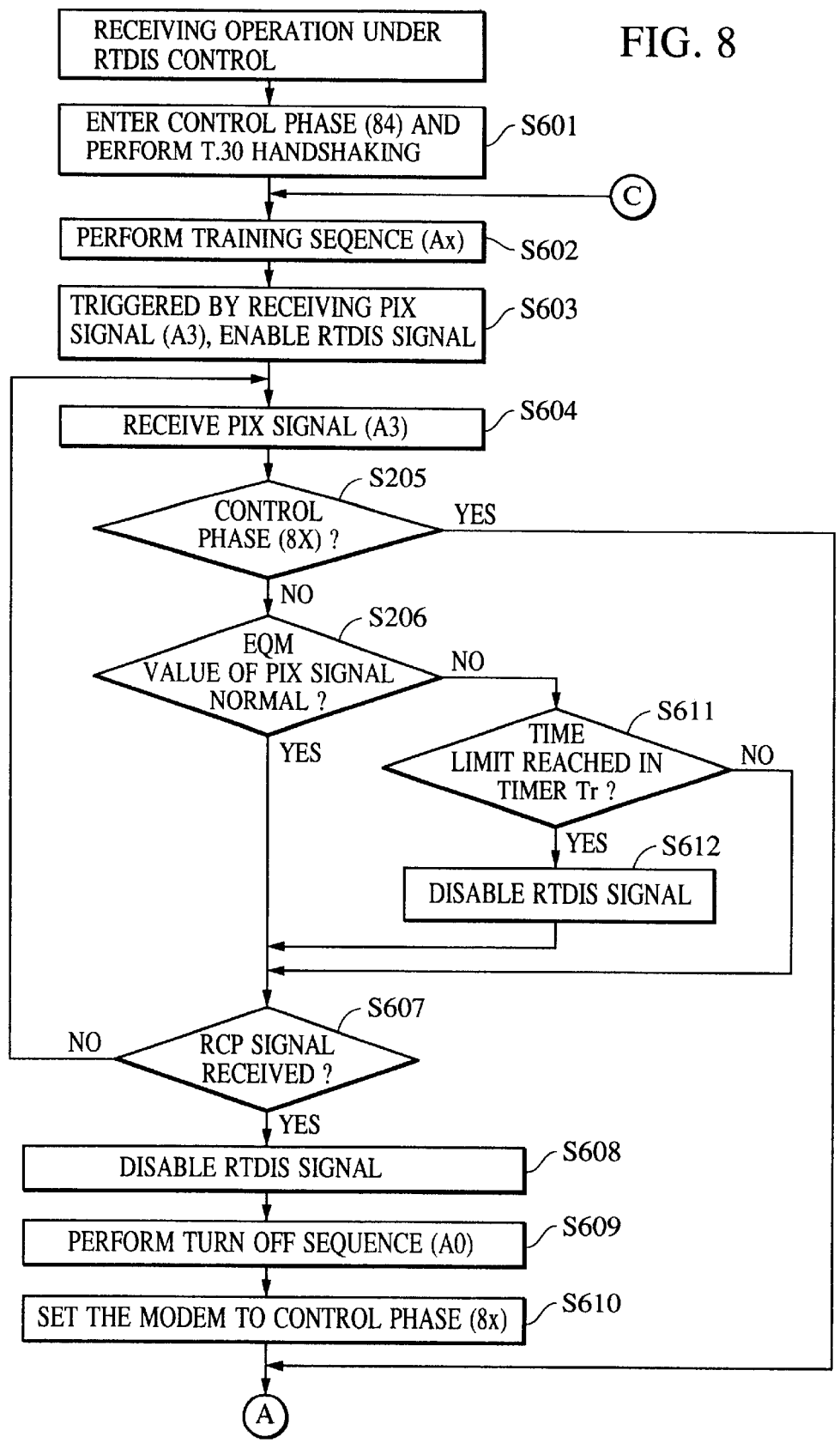
FIGS. 8 and 9 are flow charts illustrating the receiving operation performed by the CPU according to an embodiment of the present invention.
Figure 9:
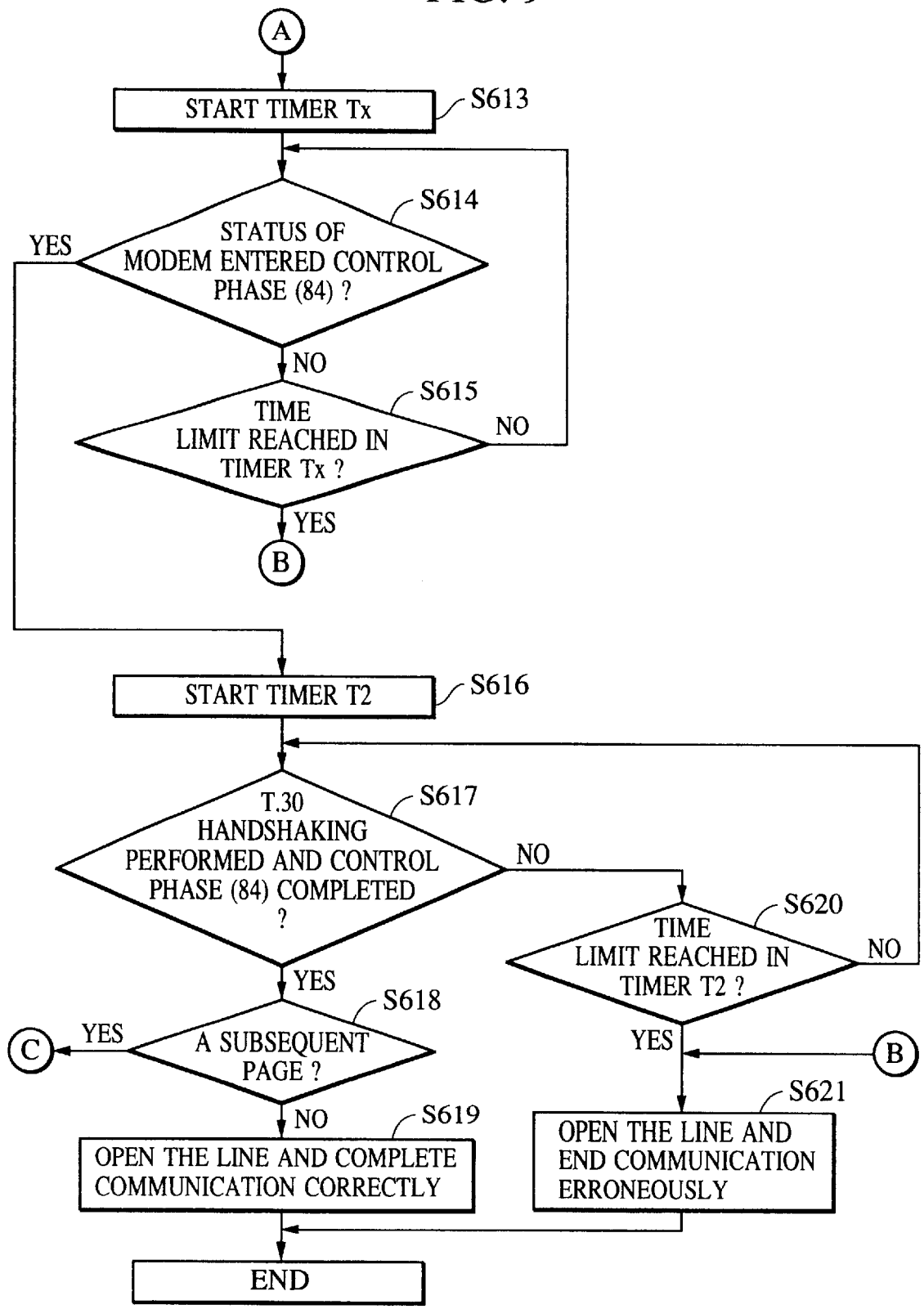

FIGS. 8 and 9 are flow charts illustrating the receiving operation performed under the control of the CPU when the communication sequence shown in FIG. 7 is used. The flow charts illustrated in FIGS. 8 and 9, as well as the sequence shown in FIG. 7, start from the communication control phase (84). The operation is as follows.

In step S601, the operation goes into the control phase (84) and performs T. 30 handshaking in compliance with ITU-Recommendation V.34 communication. In step S602, the modem 7 performs a retraining sequence (Ax) before a PIX signal (image signal) is received. Then, in step S603, triggered by receiving the PIX signal (A3), the RTDIS of the modem 7 is enabled (set to be "1"), and the process further proceeds to step S604 in which the PIX signal (A3) is started to be received.

It is then determined in step S605 whether the status of the modem 7 has entered the control phase (8x). If the answer of step S605 is yes, the process proceeds to step S613. If the answer is no, the process proceeds to step S606.

In step S606, an Eye Quality Monitor (EQM) value of the PIX signal (A3) output to the CPU from the modem 7 is input and checked. If it is determined in step S606 that the EQM value is much greater than a normal value due to some factor, namely that the demodulation of the PIX signal by the modem 7 cannot be performed, and that the synchronization provided for demodulating the PIX signal is lost because of momentary disconnection of the signal line, the process proceeds to step S611. In contrast, if the EQM value is normal, the process proceeds to step S607. In this operation, the EQM value is used for determining the state of demodulation of the PIX signal by the modem 7. However, other types of signals, such as a Carrier Detect (CD) signal or a Fast Energy Detector (FED) signal may be used instead.

If it is found in step S606 that the EQM value is normal, it is monitored in step S607 whether the RCP signal, which is the end signal of the PIX signal, output from the modem 7 has been received. If the answer of step S607 is yes, the process proceeds to step S608. If the answer is no, the process returns to step S604, and the corresponding processing is repeated.

In step S608, the RTDIS of the modem 7 is disabled ("0") in order to receive the control signals of the above-described control phase.

If it is found in step S606 that the EQM value of the PIX signal is not normal, the process proceeds to step S611. It is then determined in step S611 whether the time limit has been reached in the control timer Tr of the RTDIS. Although any value of the time limit may be set in this timer Tr, the timer Tr is set to be approximately one second in this embodiment. If the time limit has not been reached in the timer Tr, the flow proceeds to step S607. On the other hand, if the time limit has been reached, the flow proceeds to step S612.

In step S612, the RTDIS of the modem 7 is disabled, and the process proceeds to step S607. Namely, if it is determined in step S606 that the EQM value is not normal, namely that the demodulation of the PIX signal by the modem 7 cannot be performed, the process goes into a routine starting from step S611, and after a lapse of a predetermined time in the timer Tr, the RTDIS of the modem 7 is disabled. This switches the receiving modem 7 from the PIX signal phase (the receiving of an image signal) to the control signal phase (control channel communication). Accordingly, even if it is found in step S607 that the RCP signal has not been received, it is possible to escape from the routine of the receiving operation of the PIX signal by detecting that the status of the modem 7 has been shifted to the control phase (8x). This prevents the state in which the process cannot escape from the PIX signal phase, as explained with reference to FIG. 6.

As has been described above, the CPU controls the RTDIS of the modem 7 while the PIX signal is being received. Hence, even if the modem 7 is unable to maintain the synchronization for receiving the PIX signal due to the momentary disconnection of a signal line, the communication is continued rather than being erroneously ended.

Figure 10:
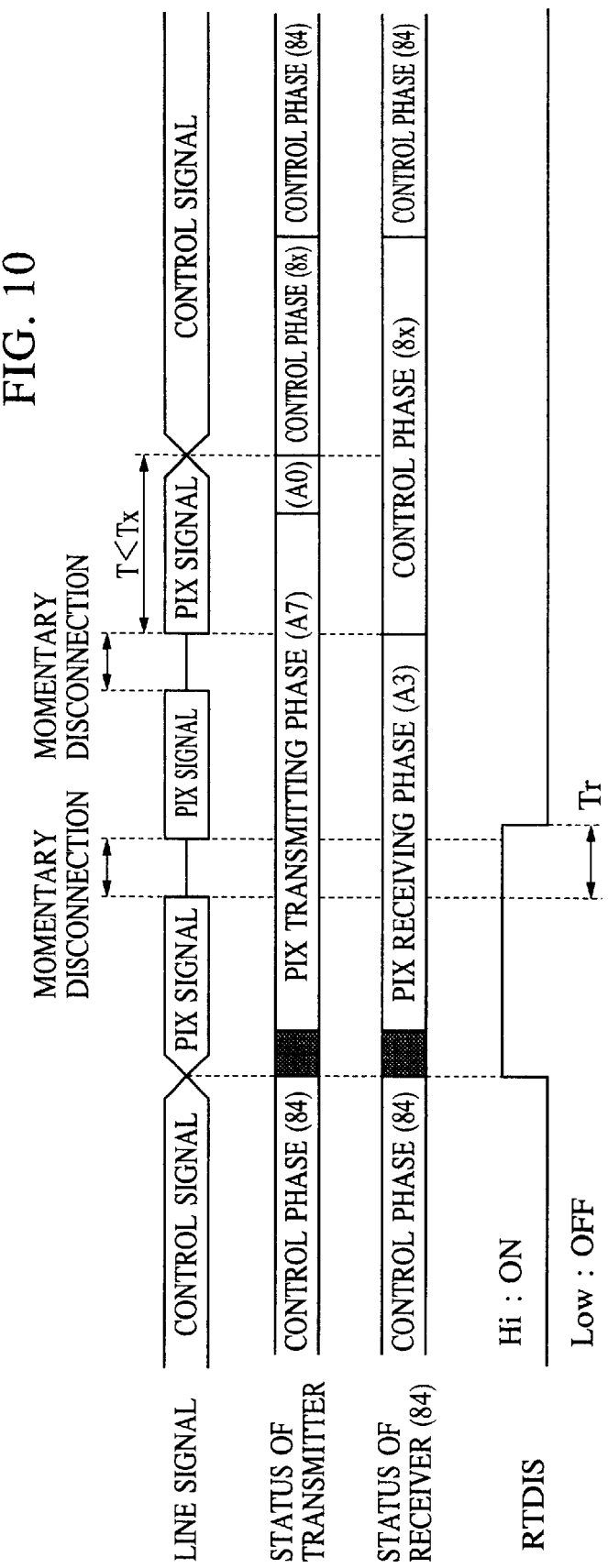
FIG. 10 illustrates an example of a communication sequence performed when a signal line is momentarily disconnected while an image signal is being received according to an embodiment of the present invention.

FIG. 10 illustrates an example of a communication sequence of this embodiment. In this sequence, the signal line is momentarily disconnected twice while the PIX signal of the first page of the document is being received. The signals shown in FIG. 10 are similar to those illustrated in FIG. 3. This communication sequence is performed according to the operation of the CPU indicated by the flow charts of FIGS. 8 and 9. The communication sequence shown in FIG. 10 is described below.

A first momentary disconnection occurs in the signal line while the PIX signal is being received. In response to this abnormal condition, the CPU (of the receiver) causes the process to proceed from step S606 to step S612 in FIG. 8. In step S612, the RTDIS of the modem 7 is disabled, and the process waits for the control phase status (8x) in order to escape from the receiving state of the PIX signal. At this time, if another momentary disconnection of the signal line occurs, the receiving modem 7 immediately shifts the operation to the control phase (8x), as explained with reference to FIG. 5. Then, the CPU starts the timer Tx, as indicated in step S613 of FIG. 9. Although any value of the time limit can be set in the timer Tx, the timer Tx is set to be approximately six seconds in this embodiment.

Subsequently, the CPU proceeds to step S614 in which it is determined whether the status of the receiving modem 7 has entered the control phase (84). If the answer of step S614 is yes, the process proceeds to step S616. If the answer is no, the process proceeds to step S615.

It is then checked by the CPU in step S615 whether the time limit has been reached in the timer Tx. Namely, the CPU determines in step S615 whether the signals (Sh signal, *Sh signal, ALT signal, and E signal) of the control phase (8x) have been sequentially received in the timer Tx. If it is found in step S615 that the time limit has not been reached, the process returns to step S614, and the corresponding operation is repeated. If the time limit has been reached, the process proceeds to step S621 in which the line is forcefully opened. Namely, if the remaining data of the PIX signal after the second disconnection of the signal line is contained within the time limit of the timer Tx, the communication is continued under normal conditions. If, however, the above remaining data of the PIX signal exceeds the time limit, the CPU judges that an abnormality has occurred, and the communication is forcefully ended. The step S616 and the subsequent steps are respectively similar to step S208 and the subsequent steps shown in the flow chart of FIG. 4.

As has been discussed above, the CPU controls the RTDIS of the modem 7 while the PIX signal is being received, and also, the timer is provided within the control phase (8x) loop. Thus, if the control phase (8x) signals are received within a predetermined time limit, communication is performed under normal conditions even if momentary disconnection of the signal line occurs a plurality of times.

A description is given below of an example of the control operation performed when a signal line is momentarily disconnected while the above control signals are being received.

In the foregoing embodiment, the operation which should be performed when the signal line is momentarily disconnected during the receiving of the PIX signal has been described. Another embodiment of the present invention is described below with reference to FIGS. 11 and 12. In this embodiment, a discussion is given of a communication sequence which should be performed when the control signals (Sh signal, *Sh signal, ALT Signal, and E signal) of the control phase (8x) fail to be received due to some factors.

Figure 11:
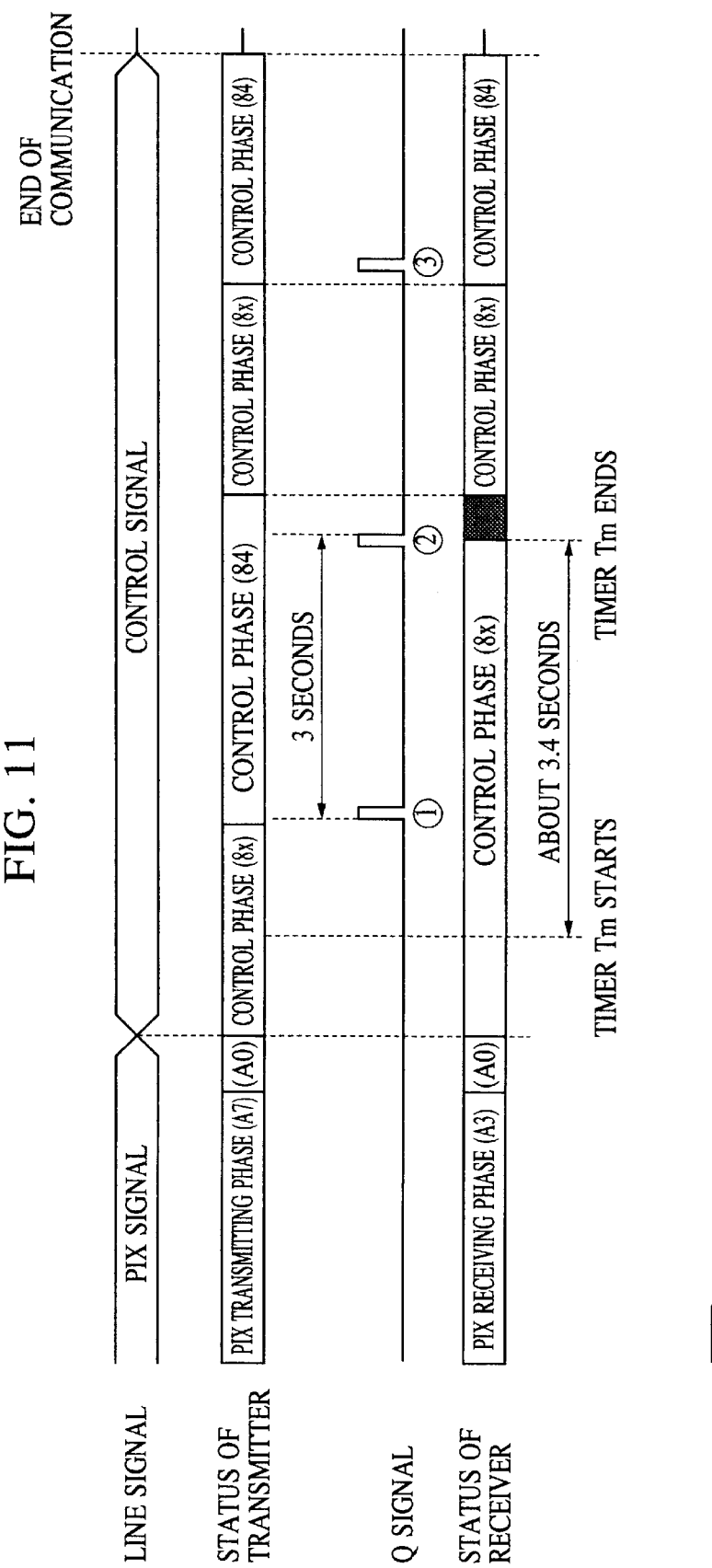
FIG. 11 illustrates a communication sequence performed when a signal line is momentarily disconnected while a control signal is being received.

FIG. 11 illustrates a communication sequence performed when the control signals of the control phase (8x) cannot be received. In FIG. 11, the communication sequence starts from the receiving of the PIX signal. The signals indicated in the first sequence shown in FIG. 11 represent the signals which are being output to the line. The signals of the second sequence represent the transmitting status of the transmitter, and the numbers indicated in parentheses designate the operating status of the transmitting modem. The signals of the second sequence are receivable and recognizable by the receiver. The signals of the third sequence indicate the Q signal transmitted by the transmitter. The signals of the fourth sequence represents the receiving status of the receiver, and the numbers indicated in parentheses designate the operating status of the receiving modem 7.

When the transmitting modem and the receiving mode fail to receive the control signals (Sh signal, *Sh signal, ALT Signal, and E signal) because of some factors while they are in the control phase (8x), as illustrated in FIG. 11, ITU Recommendation (V.34) retraining control is executed. However, this control is not executed unless the time limit of the internal timer Tm of the modem 7 has been reached after a predetermined time. Moreover, since the time limit of this timer is fixed (approximately 3.4 seconds), as illustrated in FIG. 11, the transmitter transmits the Q signal twice within an interval of three seconds in the first control phase (84) even though the receiver has not shifted to the control phase (84). Namely, the receiver fails to receive the Q signal twice when a retrain signal is generated. Moreover, if the final Q signal cannot be received by the receiver due to external noise, the communication ends erroneously.

In order to overcome the above drawback, the following control shown in FIG. 12 is performed in this embodiment. The signals illustrated in FIG. 12 are similar to those shown in FIG. 11.

In this embodiment, if retrain control is executed because of some factors, a certain time limit is set in the internal timer Tm, as shown in FIG. 12, to make the retrain timing earlier. That is, the internal timer Tm is set so that the retrain control can be performed before the transmitter transmits the Q signal for the second time. In this embodiment, the timer Tm is set to be approximately 2.1 seconds. It is thus possible for the transmitter to transmit the Q signal twice in the control phase (84) after the retrain control is performed. Accordingly, even if the receiver fails to receive the second Q signal due to external noise, the third Q signal can be reliably received.

In this manner, a certain time limit of the internal timer Tm of the modem is set to make the retraining timing of the receiver earlier, thereby making it possible to receive the second Q signal. This reduces the possibility of generating communication errors.

As is seen from the foregoing description, the present invention offers the following advantages.

The RTDIS signal of the modem 7 is controlled while the PIX signal is being received. Accordingly, even if the synchronization for the receiving of the PIX signal is lost due to momentary disconnection of a signal line, communication is continued under normal conditions rather than being ended erroneously.

Further, the RTDIS signal is controlled while the PIX signal is being received, and a timer is provided for the control phase (8x) loop. This makes it possible to perform normal communication even if momentary disconnection of a signal line occurs a plurality of times.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus that performs data communication by using a modem with a mode in which a data receiving operation is automatically shifted to a control signal communication upon detecting a momemtary disconnection while the data receiving operation is being performed, said communication apparatus comprising:

a determination unit adapted to determine an operating status of the modem; and a switch adapted to selectively enable or disable the mode of the modem in accordance with the operating status of the modem determined by said determination unit, wherein said switch disables the mode in a case where an operation is shifted to a data communication by the modem, and said switch enables the mode in a case where said determination unit determines that a data receiving status of the modem is not normal.

2. A communication apparatus according to claim 1, further comprising a timer adapted to determine a timing for operating said switch.

3. A communication apparatus according to claim 2, wherein a count time of said timer is set to any prescribed value.

4. A communication apparatus according to claim 1, further comprising a control unit adapted to delay a start of a T2 timer until a time when the modem executes a handshake of a T.30 protocol after said switch enables the mode.

5. A communication apparatus according to claim 4, wherein said control unit includes a second timer for counting a second predetermined time and delays the start of the T2 timer in the second predetermined time.

6. A communication apparatus according to claim 1, wherein the modem comprises an ITU-T Recommendation V.34 modem.

7. A communication apparatus according to claim 6, wherein a timing for shifting to retrain control executed in the control signal communication is set to be shorter than a time specified in ITU-T Recommendation V.34 so as to execute the retrain control within the timing.

8. A communication method in which data communication is performed by using a modem with a mode in which a data receiving operation is automatically shifted to a control signal communication upon detecting a momemtary disconnection while the data receiving operation is being performed, said method comprising the steps of:

determining an operating status of the modem; and selectively enabling or disabling the mode of the modem in accordance with the determined operating status of the modem, wherein the mode is disabled in a case where an operation is shifted to a data communication by the modem, and the mode is enabled in a case where a data receiving status of the modem is not normal.

9. A communication method according to claim 8, wherein the modem comprises an ITU-T Recommendation V.34 modem.

10. A communication method according to claim 9, wherein a timing for shifting to retrain control executed in the control signal communication is set to be shorter than a time specified in ITU-T Recommendation V.34 so as to execute the retrain control within the timing.

11. A communication method according to claim 8, further comprising the step of delaying a start of a T2 timer until a time when the modem executes a handshake of a T.30 protocol after the mode is enabled.

12. A communication method according to claim 11, wherein said step of delaying includes counting a second predetermined time and delaying the start of the T2 timer in the second predetermined time.

* * * * *